United States Patent

Stilling

[15] 3,640,117
[45] Feb. 8, 1972

[54] LEVEL CONTROL MEANS

[72] Inventor: Jens Ole Stilling, Lakemba, Australia

[73] Assignee: Aktiebolaget Asea-Atom, Vasteras, Sweden

[22] Filed: Sept. 21, 1970

[21] Appl. No.: 73,803

[30] Foreign Application Priority Data

Sept. 26, 1969 Sweden.................................13246/69

[52] U.S. Cl. .............................................................73/1 R
[51] Int. Cl. .....................................................G01l 25/00
[58] Field of Search ...........................73/1 R, 290 R, 432 R

[56] References Cited

UNITED STATES PATENTS 2,682,026  6/1954  Mesh et al........................73/290 UX
3,060,717  10/1962  Howe.......................................73/1 R
3,181,342  5/1965  Barengoltz..............................73/1 R Primary Examiner—S. Clement Swisher
Assistant Examiner—William A. Henry, II
Attorney—Jennings Bailey, Jr.

[57] ABSTRACT

A liquid level indicator has a level monitor arranged in a chamber adapted to be connected in parallel with a container for the liquid whose level is to be indicated. An artificial liquid level is formed in the chamber by introducing liquid or gas depending on whether the indicator is intended to indicate a too high or too low liquid level. The liquid or gas used is allowed to escape into the container, thereby testing the level monitor even when it is part of an operating system.

3 Claims, 1 Drawing Figure

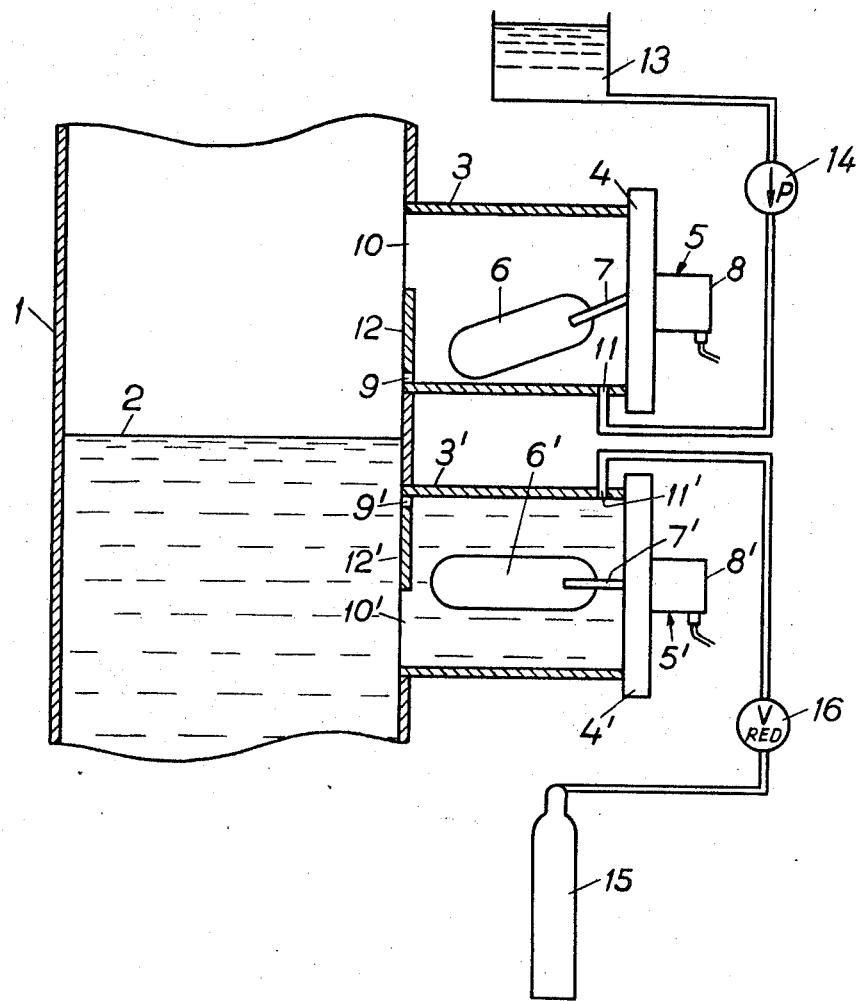

LEVEL CONTROL MEANS

The present invention relates to a level control means comprising a level monitor having a level-sensing member enclosed in a level monitor housing which is adapted to be connected to a measuring point by at least one flow channel having a limited cross-sectional area.

Level monitors intended for sensing too high or too low levels are already generally known. A usual type of level monitor has a float which by means of an arm is pivotably journaled in a breaker housing containing a microbreaker which is normally actuated magnetically by the float. The microbreaker breaks or closes an electric circuit which activates an acoustic or optical alarm means and/or activates a member to influence the level. For safety reason a breaking function is often preferred in the microbreaker.

When such a level monitor is conventionally fitted in a vessel (see, for example, British Pat. No. 870,579) there is no chance of testing the level monitor without deliberately raising or lowering the level of the liquid in the vessel. However, if the vessel is part of equipment already in operation or a safety system, such a precaution is normally impossible.

The object of the present invention is the inclusion of a level monitor in such a way that its function can be tested during operation. This is achieved according to the invention in that means are provided for feeding to the housing, also during operation, gas or liquid to displace therefrom liquid or gas, respectively, contained therein back to the measuring point through the flow channel having limited cross-sectional area or through at least one additional flow channel, the latter in such case being located at a lower or higher level, respectively, than the former, thus producing such an artificial liquid level in the housing that the level monitor emits a signal denoting too low or too high level, respectively, irrespective of the liquid level at the measuring point at the moment in question.

The level monitor housing is preferably connected to the measuring point by at least two flow channels having different cross-sectional areas and located at different levels. In this way the sensing speed is reduced for temporary rapid local alterations in level which cannot be considered to be representative for the correct average level at the measuring point, while the sensing speed for completely representative level alterations remains unchanged.

If the level monitor is arranged to sense a too high level, it is advisable for the upper flow channel to have a large cross-sectional area and the lower one a small cross-sectional area, whereas if the level monitor is intended to sense a too low level, it is advisable for the upper flow channel to have a small cross-sectional area and the lower one a large cross-sectional area. This means that the level sensing member can be tested without mechanical strain.

In the following embodiment of the invention selected as an example will be described more fully with reference to the accompanying drawing which shows, partly in longitudinal section, a part of a vessel provided with an upper and a lower level monitor.

The vessel 1, which may be a container where the bottom and top parts are not shown, or a tube, is part of the safety system for a nuclear reactor and is filled with water to a variable level 2 above which is a gas such as air. There are two holes in the wall of the vessel 1 into which an upper level monitor housing 3 and a lower level housing 3' have been welded. The level monitor housings 3 and 3' end on the outside in flanges 4 and 4', respectively, an upper level monitor 5 and a lower level monitor 5', respectively, being attached here. As level-sensing members the level monitors 5 and 5' have floats 6 and 6', respectively, which are pivotably journaled by means of arms 7 and 7', respectively, in the breaker housings 8 and 8', respectively, screwed into the flanges 4 and 4'. Each breaker housing contains a microbreaker, not shown. The pressure necessary to switch the microbreaker is transmitted from the float via the pivot arm and a first magnet, not shown, attached to this, to a movable second magnet arranged inside the breaker housing, the latter magnet being connected to the breaking member of the microbreaker. Each microbreaker is arranged to break an electric circuit, not shown, and thus in known manner activate an optical or acoustic alarm signal, not shown.

Each level monitor housing 3 and 3', respectively, is in communication with the inside of the vessel 1 by means of a flow channel 9 and 9', respectively, having a small cross-sectional area and a flow channel 10, 10', respectively, having a large cross-sectional area. In the embodiment shown the flow channels 9 and 9' comprise small holes drilled through an intermediate wall 12, 12', respectively. The intermediate walls cover only a little over half the entire cross section of the level monitor housings 3 and 3' and the flow channels 10 and 10' in the form of large holes comprise the remaining part of the respective cross sections. Furthermore, each level monitor housing is provided with an inlet, 11 and 11', respectively, for pressure medium. The distance between the level monitors depends on the desired control range. If a very short control range is desired both the level monitors cannot be arranged on the same vertical line for reasons of space. However, there is nothing preventing them from being placed on different vertical lines along the vessel wall.

The upper level monitor housing 3 is normally filled with air and the lower housing 3' with water. Furthermore, in the upper level monitor housing 3 the large hole 10 is located above the small hole 9 and the pressure medium inlet 11, whereas in the lower level monitor housing 3' the holes are arranged the other way around, that is the large hole 10' is located below the small hole 9' and the pressure medium inlet 11'. In both cases the intermediate walls 12 and 12' finish in a straight, horizontal edge. Of course, the inlets 11 and 11' for pressure medium may be placed in other ways than that shown, but it must be ensured that the function of the float is not impaired.

The level monitors operate in the following way: If the water level 2 in the vessel 1 is raised, water flows into the upper level monitor housing 3 through the small lower hole 9 so that the air is displaced and passes out through the large upper hole 10 and the water lifts the float 6 so that the alarm is given for too high a level. If, on the other hand, the water level in the vessel drops, air flows into the lower level monitor housing 3' through the small upper hole 9' while the water flows out through the large lower hole 10' and the water level in the lower level monitor housing drops as well as the float 6' carried by the water, so that the alarm is given for too low a water level. The large holes 10 and 10'have such a large cross-sectional area that the water which flows from the vessel 1 into the upper level monitor housing or from the lower level monitor housing out into the vessel 1 is not noticeably impeded. The small holes 9 and 9', however, should give considerable resistance to flow for reasons which will be given below and they may have a diameter of 4 mm., for example.

In order to test the function of the level monitor 5, pressurized water is supplied through the lower opening 11. Water may be taken, for example, from a container 13 and placed under pressure by means of a pump 14. The quantity of water supplied per time unit must be greater than the quantity of water which during the same time runs out through the small lower hole 9. In this way the water will rise within the housing 3 and lift the float 6 so that, if the level monitor 5 is functioning correctly, an alarm will be given. When the test is finished the water runs out of the level monitor housing 3 through the lower small hole 9.

The function of the lower level monitor 5' is tested in a corresponding manner. In this case, however, pressurized air or some other pressurized gas is used instead of pressurized water. For instance, pressurized air may be taken from, for example, an air cylinder 15 having high pressure, the pressure reduced in a reducing valve 16 and the pressurized air supplied to the level monitor housing 3' through the upper opening 11'. Some of the pressurized air passes out through the upper small hole 9' whereas the rest of the pressurized air lowers the water level in the lower level monitor housing and therefore also the float 6' to such an extent that an alarm is given if the level monitor is functioning correctly. When the test is complete the air passes out of the level monitor vessel 3 through the small upper hole 9'.

One of the advantages of the invention is that the level monitor housings 3 and 3' can be manufactured exactly alike and it is only when they are being fitted that it must be decided whether the housing should be fitted the right way up or upside down.

I claim:

1. Level control means comprising a level monitor having a level-sensing member enclosed in a level monitor housing which is adapted to be connected to a measuring point by at least one flow channel having a limited cross-sectional area, characterized in that means are provided for feeding to the housing, also during operation, gas or liquid to displace therefrom liquid or gas, respectively, contained therein back to the measuring point through the flow channel having limited cross-sectional area or through at least one additional flow-channel, the latter in such case being located at a lower or higher level, respectively, than the former, thus producing such an artificial liquid level in the housing, that the level monitor emits a signal denoting too low or too high level, respectively, irrespective of the liquid level at the measuring point at the moment in question.

2. Level control means according to claim 1, characterized in that the level monitor housing is connected to the measuring point by at least two flow channels having different cross-sectional areas and located at different levels.

3. Level control means according to claim 2, in which the level monitor is intended to sense a too high level, characterized in that the upper flow channel has a large cross-sectional area and the lower one a small cross-sectional area.

* * * * *